Dec. 19, 1933.  P. H. ROYSTER  1,940,371
APPARATUS FOR HEATING GASES
Filed May 6, 1930
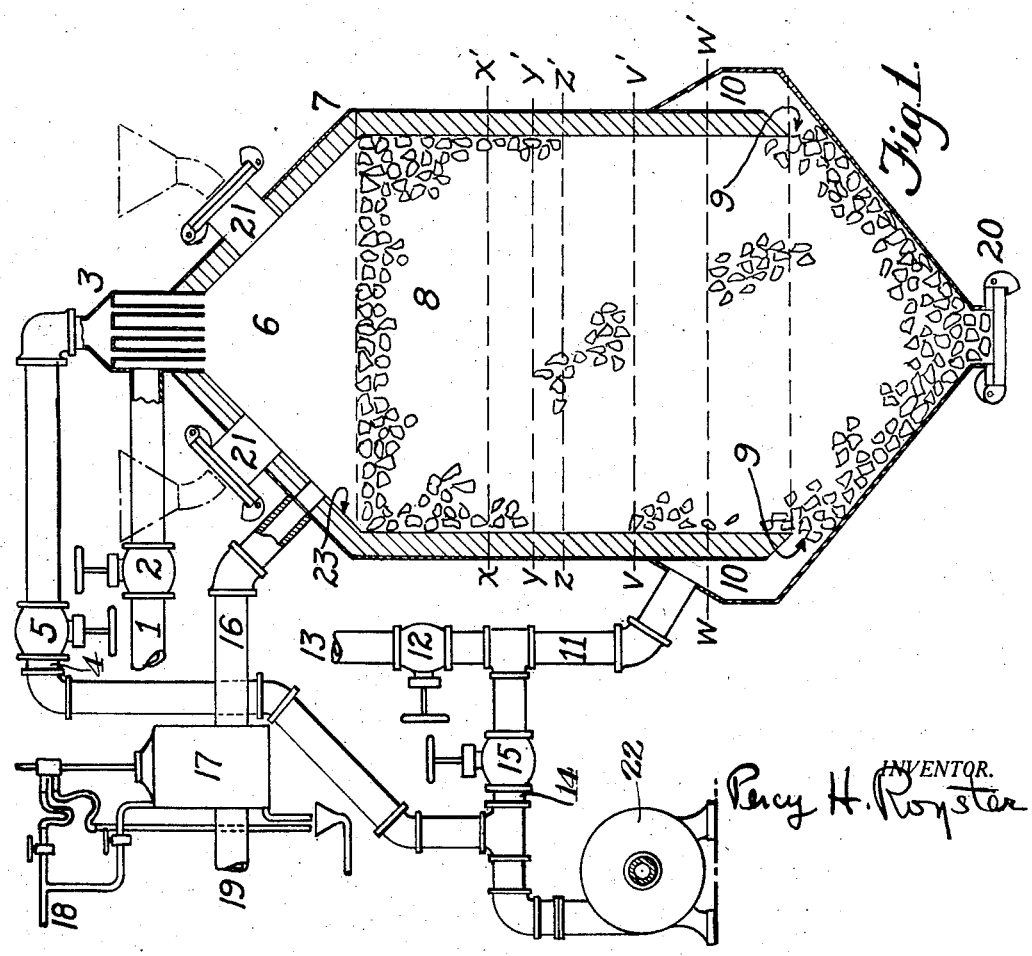

Patented Dec. 19, 1933

1,940,371

UNITED STATES PATENT OFFICE 1,940,371

APPARATUS FOR HEATING GASES

Percy H. Royster, Washington, D. C., assignor to Research Corporation, New York, N. Y., a corporation of New York Application May 6, 1930. Serial No. 450,271

4 Claims. (Cl. 257—6)

REISSUED

My invention relates to heating gases for use in technical processes and includes an improved apparatus for carrying out the said heating.

The object of my invention is to provide means for heating a variety of industrially important gases, including particularly air, to higher temperatures than have heretofore been practical, and to a more nearly uniform temperature than can be obtained by such methods and devices as have been used or proposed: at the same time my invention permits the realization of a high efficiency in the use of fuel, and a saving both in the cost of constructing the heating apparatus and in the cost of its upkeep and repairs. As examples of the use to which I propose to apply my process I may cite the preheating of air for combustion in blast furnaces; for preheating of air and gases for open hearth furnaces, for heating the air or fuel for coke ovens, soaking pits, lime kilns, cement kilns, gas producers and in general for any industrial furnace or process operated at elevated temperatures.

My process of heating gases is of the type known generically as "regenerative", exemplified by the so-called Cowper hot-blast stoves and the Siemens-Martin furnace regenerative heaters.

The following faults appear to have been inherent in all of these stoves: the exchange of heat between the fire-brick-checkerwork and the gases passing through it, during the heating period has not been sufficiently good to extract all of the heat from these gases. A second fault has been that during the succeeding "cooling period" this same relative low rate of heat exchange between the firebrick-checkerwork and the gas passing through it has failed to bring the temperature of this gas up to the brick temperature. For fear of fusion, flowing, fluxing, sagging, slagging, erosion, and cracking of the checkerwork, the maximum allowable brick temperature is necessarily limited and the maximum temperature to which it has been possible to preheat the air or gas in many of the prior art types of regenerative stoves has been somewhat low. A third fault has been that the gas emerging during the cooling period has been more highly heated at the beginning of the period than at the end, with the result that the temperature of the air or gas heated has been an up and down affair and in many processes where uniformity is essential to control, this has been objectionable. A fourth fault of major importance has been the loss of efficiency in such stoves whenever coatings of dust and fume settle on the checkerwork, necessitating frequent and expensive cleaning operations.

In the older stoves the element of structure was essentially the standard firebrick. The checker design was a multiplicity of straight flues. In an attempt to increase the degree of thermal intimacy between the brick and the passing gases the size of the flues has been reduced. In all proposed arrangements the better the heat transfer, the more difficult the cleaning operation, and at higher temperatures the greater the danger of the cracking of the brick and spoiling of the checkerwork. Staggering the bricks to produce a zigzag path for the gases greatly improves the thermal transfer from gas to brick but makes the cleaning of the brickwork apparently impossible.

The object of the invention herein described is to remedy as far as possible the above enumerated faults. The present invention is distinguished from the prior art processes by the following results and means by which these results are attained. First: throughout the whole of the heating period the exhaust gases emerge from my heaters sensibly at atmospheric temperature, thereby permitting the process to operate with as close an approximation to 100% of thermal efficiency as is necessary or desirable. Second: the temperature of the air or gas delivered by my stoves or heaters is uniformly high throughout the whole of the cooling. Third: this uniform temperature is as high as may be desired, limited only by the melting point of the refractory material used to construct the heat absorber, or by the combustion temperature of the fuel used for heating. Fourth: cleaning my heat-absorbers is simple, inexpensive and rapid; so rapid indeed that no spare heater is needed to replace a stove withdrawn from service for cleaning, the cleaning process being readily sandwiched between any convenient cooling period and the subsequent heating period. Fifth: the quantity of heat absorbing material required is very much less than in prior heaters, which permits the construction of heaters with less material, in less space, and at less cost. Sixth: the construction of my heaters is more rugged and resistant to mechanical, chemical, or thermal abuse, and the damage done to them by accidental over-heating, by corrosive fumes or gases, by too sudden changes in temperature, or by gaseous explosions is much more readily repaired.

The successful operation of my process demands a unit or element of heat absorbing structure which is at once resistant to high temperature and rapidly responsive, both at the surface and at the center to changes in surface temperatures. In the second place it demands that these elements of the heat absorbing structure be assembled in such a fashion that they intercept and remove a relatively large amount of the heat from the hot gases passing near and across the surface of each element during the heating period, and with equal effectiveness impart their stored-up heat to the cooler gases passing during the cooling period. It is finally demanded that this assembly of heat absorbing elements shall be easily cleaned.

It has been discovered that the physical property of matter that is sufficient to satisfy the above apparently severe set of requirements is size. If one construct a heat absorber from elements which are sufficiently small, all of the above requirements are rather automatically fulfilled. It is well known that all materials resistant to high temperature are poor conductors of heat. Since the time of heating a particle varies with the square of its linear dimensions, a particle to be rapidly responsive to changes in temperature must be relatively small. For example, with a 4 inch sphere of firebrick 32 minutes are required to bring the center of the sphere to 90% of the temperature of its surface; with a 2 inch sphere, 8 minutes; with a 1 inch sphere, 2 minutes; and with a ½ inch sphere, 30 seconds.

The first requirement for a suitable heat absorber for my process is satisfied by using as an element of structure for the absorber any conveniently shaped refractory particle whose linear dimensions are sufficiently small relative to the thermal conductivity of the material that the time required for a heat wave to diffuse to the center is short relative to the duration of the heating and cooling periods.

The second requirement of my process, is fortunately satisfied by meeting the first. If I attempt to construct a heat absorber with refractory particles, approximating spheres, and of about one inch in diameter, I must of necessity merely pour them into a chamber. The gases passing through interstices of this bed then follow a highly irregular parallel-series array of branched zig-zag paths.

The third requirement of my process is also satisfied by the arrangement adapted to satisfy the first two requirements. When a poured bed of refractory particles becomes dirty, the process of cleaning consists merely of opening the chamber containing them at a point below the bed and allowing the dirty particles to flow out by gravity. A new bed may be formed by pouring in from the top a mass of clean particles. This changing of the bed takes place preferably at the termination of one of the cooling periods, when most of the refractory particles are cold. These brick particles may be readily cleaned in any convenient way, and poured back into the next stove that may need cleaning.

In order to give a clear description of my process for heating gases, it will be convenient to take as a specific example the case of the preheating of air for blowing a blast furnace. According to this example the available fuel is a blast furnace gas which in practice contains from 21 to 28 per cent carbon monoxide with perhaps 2 or 3 per cent hydrogen, as combustibles, the remaining gas being largely nitrogen and carbon dioxide. I prefer to use two similar stoves, and I operate one of them on its heating period while the other is on its cooling period. Blast furnace gas, with air for its combustion supplied by a suitable fan or blower is used to produce the hot gases during the heating period. A satisfactory heater or stove for this service is shown in Fig. 1 of the accompanying drawing. One stove is shown. It is understood that a second stove similar to it and with similar pipe and valve connections is used, both together constituting a pair of regenerative stoves capable of supplying preheated air to a blast furnace at a uniform temperature.

The accompanying drawing represents a heater shown partly in section and partly diagrammatical, and Fig. 2 is a graph showing temperature conditions at various levels of the absorbing bed. Throughout the heating period, blast furnace gas is admitted through the gas-main 1, passes the open gas valve 2, and enters the burner 3, where it is mixed with air under forced draft entering the draft main 4, through the open draft-valve 5. The gas-air mixture burns in the combustion chamber 6, which is the upper open part of the heater-chamber or stove 7. The hot products of combustion are forced through the heat-absorber, i. e., the bed of refractory particles 8. The products of combustion having been cooled pass out of the stove through the annular opening 9, by way of the chamber 10, through the conduit 11, through the open chimney valve 12, and out the exhaust 13. During this period valves 15 and 17 remain closed. At the termination of the heating-period valves 2, 5, and 12 are closed, the cold-blast-valve 15 is opened and air from the blowing engines shown diagrammatically at 22 is introduced through the cold-blast main 14, through 11, 10, 9, into the bed of refractory particles 8, flowing now upwardly. The air emerges from the top of bed 8 in a highly heated condition and passes through the thermally insulated conduit 16, through the open hot-blast valve 17, and is delivered through the hot blast-main 19 to the blast furnace. Water from the supply line 18 is used to cool the valve and valve seat within the valve 17. At the termination of the cooling period, valves 17 and 15 are closed, valves 2, 5, and 12 are opened and another heating period is commenced. A second similar stove is used and is operated in a similar fashion except that the second stove is subjected to a heating period while the number one stove is on its cooling period, and vice-versa. More than two stoves of course may be used but at least two are necessary to continuous heating of the blast.

From time to time, it may be found that the heat-absorber has become unsatisfactory in its operation for one or more of the following reasons: (a) coating of dust, dirt, or fume may accumulate on the surface of the particles, reducing the thermal efficiency and by clogging the interstitial spaces between the particles increases the pressure drop necessary to force the burner gases and the air through the absorber; (b) this back pressure may also become unduly high through the cracking up of some of the particles under thermal strains; or through accidental overheating, the particles may become sticky and semi-fused and may flux together. At the end of any cooling period then, one may remove the plate-cover from port 20 and allow some or all of the particles to flow out of the chamber, for cleaning. At the same time a number of ports 21, 21, located at convenient positions at the top of the stove are opened and a fresh supply of refractory particles is poured into the stove and the bed 8, formed in its normal position as shown. Any particles of the old bed which refuse to flow out, or tend to hang to the brick lining 23 of the chamber 7 may be removed by bars introduced through the open ports 21. When ports 20 and 21 are closed the heating period is commenced and normal operation resumed.

In order to facilitate the description of my process as carried out with these stoves there is attached on the right of the drawing of the stove a diagram, identified as Fig. 2, in which by means of the curves shown there is indicated the temperature at any point in the absorbing bed 8 and at any time during the operation. For example after about one-third of the heating period has elapsed the curve A. B. C. D. will represent the temperature of the brick particles at each plane in the bed. In this case it is supposed that the temperature of the products of combustion in the combustion zone 6 is at 1450° C. From the top of the bed 8 down to the plane X—X' the temperature of the refractory particles, which may conveniently be pieces of fire-brick screened between 1¼ inches and ¾ inch mesh; is not much below 1450° C., say 1400° C. or above, and that part of the bed below the plane Z—Z' is substantially at the temperature of the air from the blowing engines admitted during the preceding cooling period, say 30° C. Between the planes X—X' and Z—Z' the temperature of the particles changes rapidly from plane to plane. On the curve A. B. C. D. in the temperature diagram shown to the right the temperature of the particles in plane X—X' is shown as the point B, the temperature at the plane Y—Y' is shown as the point C, and the temperature of the particles in plane Z—Z' is given by the point D.

It is seen that the bed is divided into three rather distinct sections, the lower section (below Z—Z') being cold, the upper section (above X—X') being essentially at the burner temperature, and a transition section (between XX' and ZZ') and the transition section being short relative to the total distance from the top to the bottom of the bed. The temperature of the gases at each point in the bed is shown by the dotted line A' B' C' D' and at each point is higher than the corresponding temperature of the solid particles. It will be seen that the dotted curve A' B' C' D' differs from the solid curve A B C D by a very small number of degrees in the hot section above X—X' and in the cold section below Z—Z'. This difference in temperature at a point in the transition section (between X—X' and Z—Z') is rather large; for example, in the plane Y—Y' the gas temperature is shown by point C' and the temperature of the particles in that place is shown by the point C, and this difference in temperature given by the length of the line C' C is the thermal head which causes the heat to be transferred from the gas to the solid particles.

The effect of continuing the passage of the hot gases and extending the heating period is in effect to transport the curve A B C D and A' B' C' D' bodily down the bed, until after the elapse of about two-thirds the duration of a heating period, the temperature of the solids being represented by the curve EFG, and the temperature of the gas by the dotted curve E' F' G'. It can perhaps properly be said that a thermal wave is moving downwardly through the bed. The sharp, steep, wave-front within the transition zone in effect moves down the bed with an approximately uniform velocity, and during its progress is but little distorted. At the end of two-thirds of the heating period the transition zone is contained within the zone between these two planes V—V' and W—W' and the distance between these planes is substantially the same as the distance between the planes X—X' and Z—Z'. This kind of thermal wave is here designated as a convective wave, to indicate the fact that the heat is transported down the bed being carried along or conveyed by the moving gases and to distinguish this type of thermal wave from a conductive wave wherein heat is carried by thermal conduction.

The heating period is conveniently terminated when the wave front reaches the position HJK for the temperature of the solid, and H' J' K' for the temperature of the gas. Valves 2, 5, and 12, being now closed, valves 15 and 17 being opened cold air is caused to flow upward through the bed and a cooling period is commenced. At the first moment of the cooling period the solid curve HJK remains unchanged, but the curve H' J' K' ceases to have a meaning. The temperature of the air is given by the curve H" J" K", being at each point as much below the curve HJK, as the curve H' J' K' the moment before was above HJK. From the point H" to the top of the bed the curve H" J" K" (drawn as a dash-and-dot line) is slightly below the solid line HJK. I have found that the temperature of the gas emerging from the hot blast outlet 16 is but little below the temperature of the burner gases in the heating period. As the cooling period continues the thermal wave recedes travelling upwardly through the bed. It is often the case that the amount of heat lost through the insulating lining 23 is small, and on its upward journey through the bed 8, the shape of the wave is essentially similar to the shape it had assumed in its downward journey.

It may be stated succinctly that the present process is operated by blowing a convective heat wave down the bed with hot gases, and then blowing it back up the bed with cold air. And during this to and fro journeying of the wave front heated gas never comes out the bottom of the bed, nor unheated air out of the top.

By the "thermal reactivity" of a solid, which is subjected to the heating or cooling effect of a gas, I mean to describe the rapidity with which the solid takes up heat from a hotter gas and loses heat to a colder gas. Furthermore this term refers not only to the effectiveness with which the surface of the solid extracts heat from a hotter gas passing near it but to the effectiveness and rapidity with which the heat so absorbed at the surface diffuses into the interior positions of the solid. By the term "thermal diffusion time" as applied to a solid, is meant the length of time required for a change in temperature at the center of a solid to amount to some rather arbitrary fraction, say 90 percent of the change in the temperature to which the surface of the solid is subjected.

The only solid mentioned above as a heat absorbing material is fire-clay or fire-brick. For such temperatures as are attainable or desirable in many processes fire-brick is sufficiently refractory. The invention specifically includes, however, the use of any of the other suitable refractories wherever in the application of my process the temperature limit set by the melting point of fire-brick is too low. Quartz, fused silica, spinel, sillimanite, porcelain, alumdum, zirconia, zircite, corundum, carborundum, etc., are solids the use of which is obviously indicated in many special applications of my process.

The pressure-drop required to force gas through a bed of small particles is greater than the pressure-drop required to force the same quantity of gas through a checkerwork of the same shape and made of standard fire brick according to the usual design. However, according to the present process it has been found that this pressure drop can be made as low as is desired in any particular case by making the cross-section of the absorbing bed at right angles to the direction of gas flow large compared with the length measured along the direction of gas flow.

I claim:

1. Apparatus for regeneratively heating a gas, which comprises a chamber, a mass of gas-traversable promiscuously deposited refractory particles filling the lower and central portions of the chamber, the particles being freely bedded therein and supported against gravity only by direct contact with continuous imperforate surfaces of the chamber, the chamber being provided with inlet and discharge means for the gravitational replacement of said bed, a gaseous fuel burner above said chamber in direct association with a free space in said chamber immediately above and adjacent the top of said bed for the combustion of a gaseous fuel, openings in said chamber in the top portion and adjacent the bottom of the central portion thereof and constituting with associated valved conduits means for introducing and withdrawing streams of heating gas and gas to be heated into and from the interior of said chamber and said openings so located with respect to the said mass as to cause streams of said gases to traverse at least the upper portions of said bed, and means associated with said conduits for positively and alternately moving streams of heating gas and gas to be heated through the upper portions of said mass under forced draft.

2. Apparatus for regeneratively heating a gas, which comprises a chamber, a mass of gas-traversable promiscuously deposited refractory particles filling the lower and central portions of the chamber, the particles being freely bedded therein and supported against gravity only by direct contact with continuous surfaces of the chamber, the chamber being provided with inlet and discharge means for the gravitational replacement of said mass, a free space in said chamber immediately above and adjacent the top of said mass, openings in said chamber in the top portion and adjacent the bottom of the central portion thereof and constituting with associated valved conduits means for introducing and withdrawing streams of heating gas and gas to be heated into and from the interior of said chamber and said openings so located with respect to the said mass as to cause streams of said gases to traverse at least the upper portions of said mass, and means associated with said conduits for positively and alternately moving streams of heating gas and gas to be heated through the upper portions of said mass under forced draft.

3. Apparatus for regeneratively heating a gas, which comprises a chamber, a bed of gas-traversable promiscuously-deposited refractory particles filling the lower and central portions of the chamber with a free space in the latter immediately above and adjacent the said bed, the bed being relatively broad with respect to its effective height, openings in said chamber constituting with associated valved conduits means for introducing and withdrawing streams of gas into and from said chamber said openings being so located with respect to said bed as to cause streams of said gas to traverse at least the upper portions of said bed, and means associated with said conduits and openings for positively and alternately moving streams of heating gas and gas to be heated through at least the upper portions of said bed under forced draft, the apparatus being further characterized in that the said bed is in part bounded by exit and entrance surfaces each of which slopes no higher than the angle of repose of the particles constituting said bed and is in direct contatct with a free space, each of said surfaces being at least as extensive in area as is the cross-section of said bed transverse to the direction of gas flow.

4. Apparatus for regeneratively heating a gas, which comprises a chamber, a bed of gas-traversable promiscuously-deposited refractory particles of relatively small diameter filling the lower and central portions of the chamber with a free space in the latter immediately above and adjacent the said bed, the bed being relatively broad with respect to its effective height, openings in said chamber constituting with associated valved conduits means for introducing and withdrawing streams of gas into and from said chamber, said openings being so located with respect to said bed as to cause streams of said gas to traverse at least the upper portions of said bed, and means associated with said conduits and openings for positively and alternately moving streams of heating gas and gas to be heated through at least the upper portions of said bed under forced draft, the apparatus being further characterized in that the said bed is in part bounded by exit and entrance surfaces each of which slopes no higher than the angle of repose of the particles constituting said bed and is in direct contact with a free space, each of said surfaces being at least as extensive in area as is the cross-section of said bed transverse to the direction of gas flow, and in that the said bed is supported against gravity only by imperforate walls.

PERCY H. ROYSTER.